July 3, 1934.  A. WARMISHAM  1,964,968
OPTICAL DEVICE
Filed Nov. 11, 1931  6 Sheets-Sheet 1
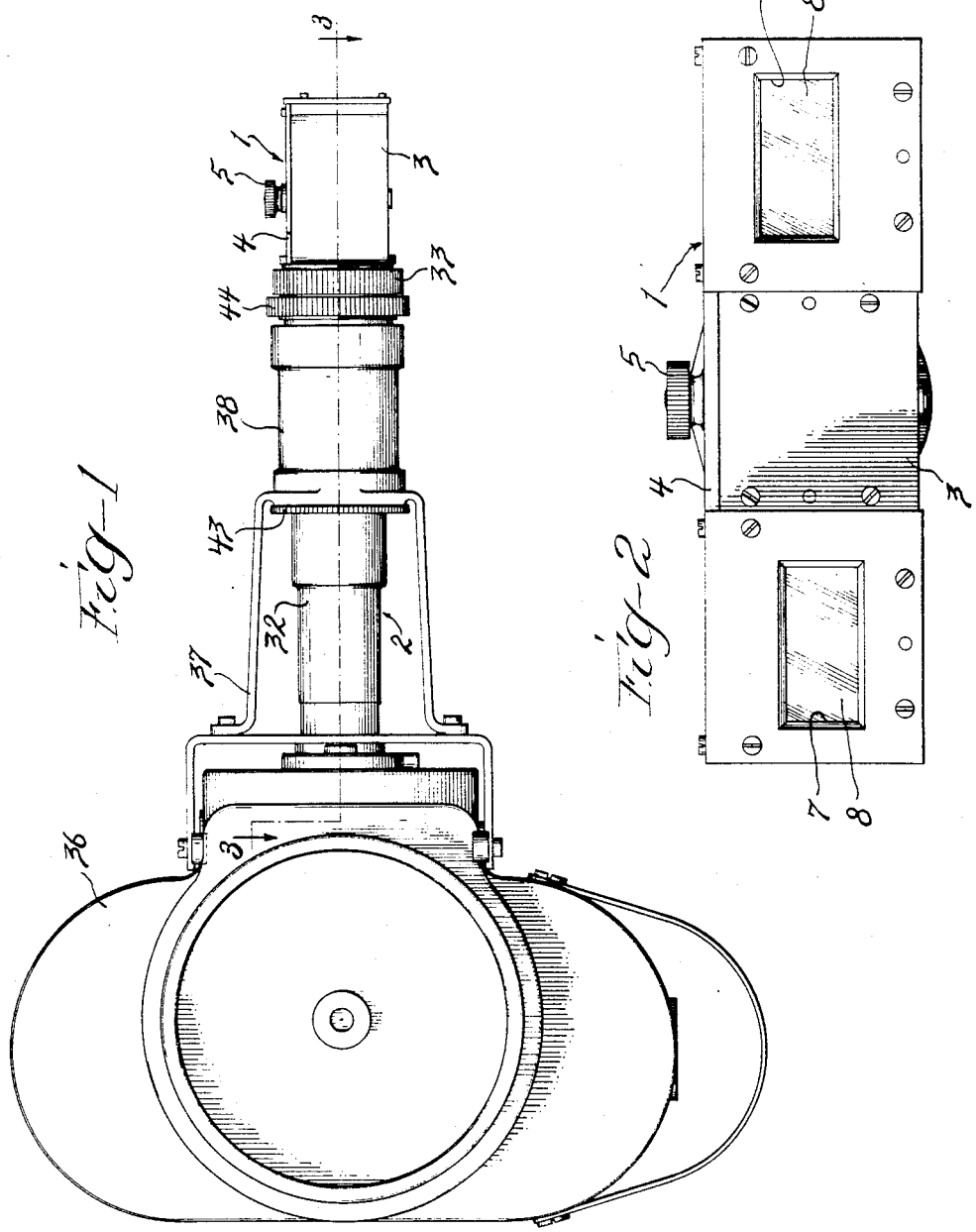
Inventor:
Arthur Warmisham
By: Miehle & Miehle,
Atty's.

July 3, 1934.　　　A. WARMISHAM　　　1,964,968
OPTICAL DEVICE
Filed Nov. 11, 1931　　　6 Sheets-Sheet 2
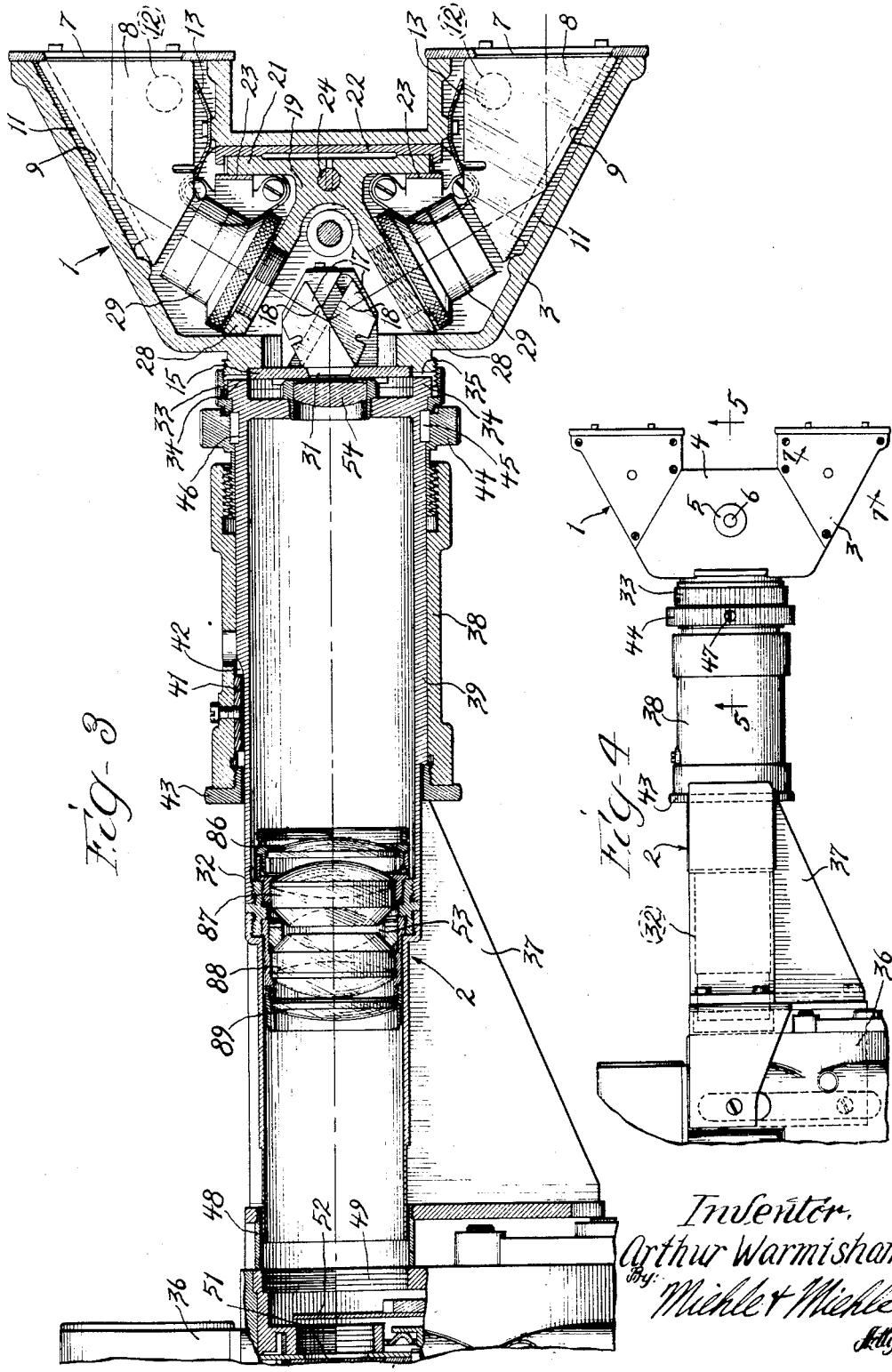

July 3, 1934.　　　A. WARMISHAM　　　1,964,968
OPTICAL DEVICE
Filed Nov. 11, 1931　　　6 Sheets-Sheet 3
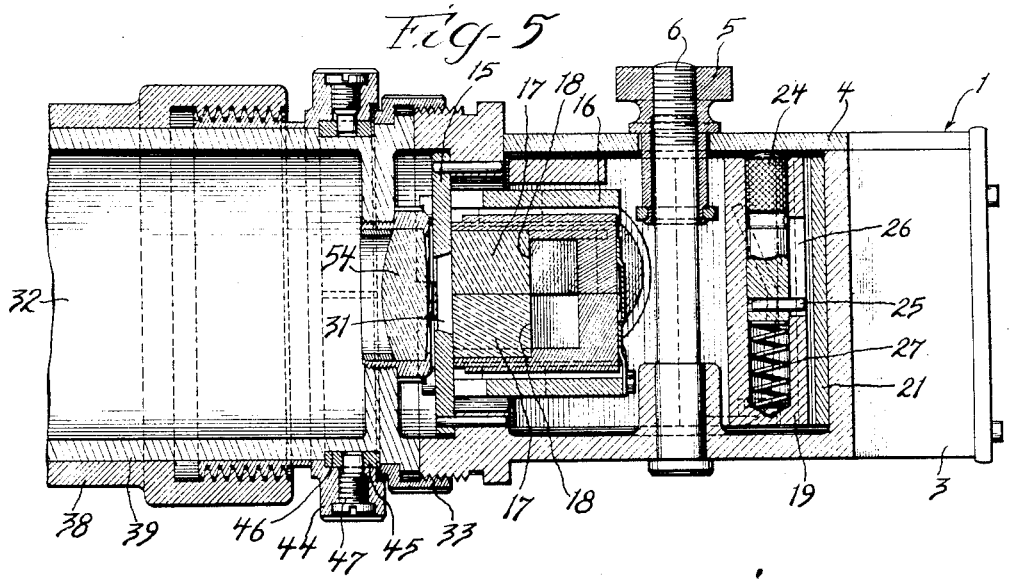
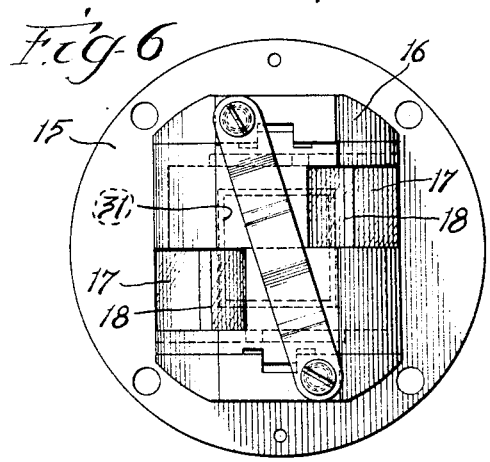
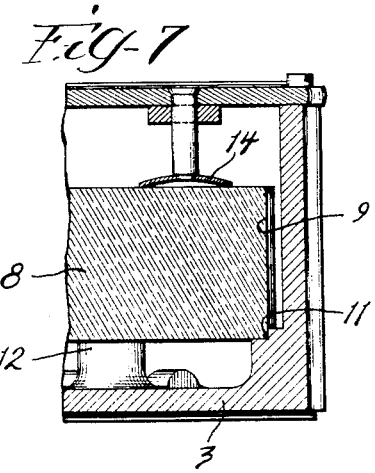
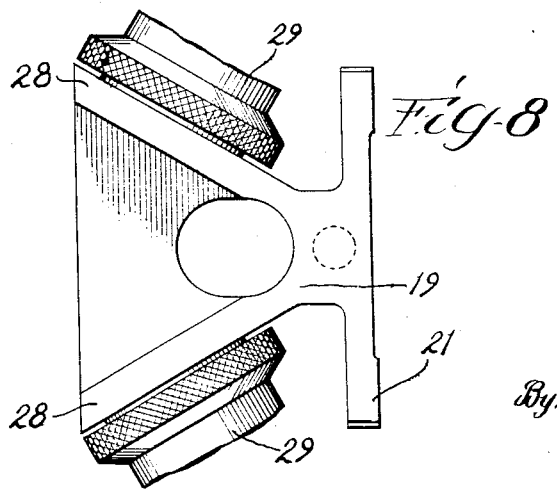
Inventor.
Arthur Warmisham
By:- Miehle & Miehle,
Attys.

July 3, 1934.  A. WARMISHAM  1,964,968
OPTICAL DEVICE
Filed Nov. 11, 1931  6 Sheets-Sheet 4

Inventor,
Arthur Warmisham
By Michle & Michle
Attys.

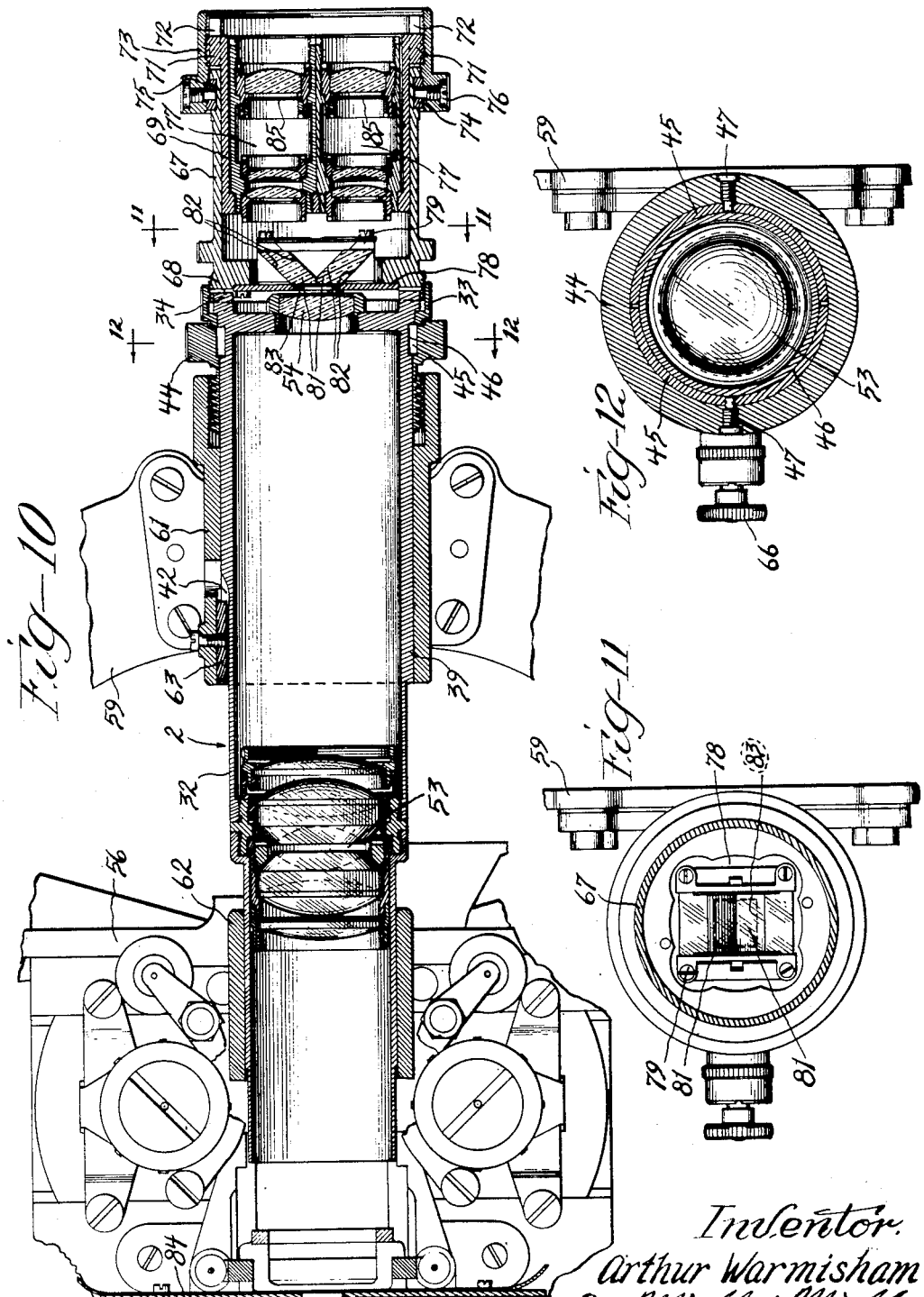

July 3, 1934. A. WARMISHAM 1,964,968
OPTICAL DEVICE
Filed Nov. 11, 1931 6 Sheets-Sheet 6
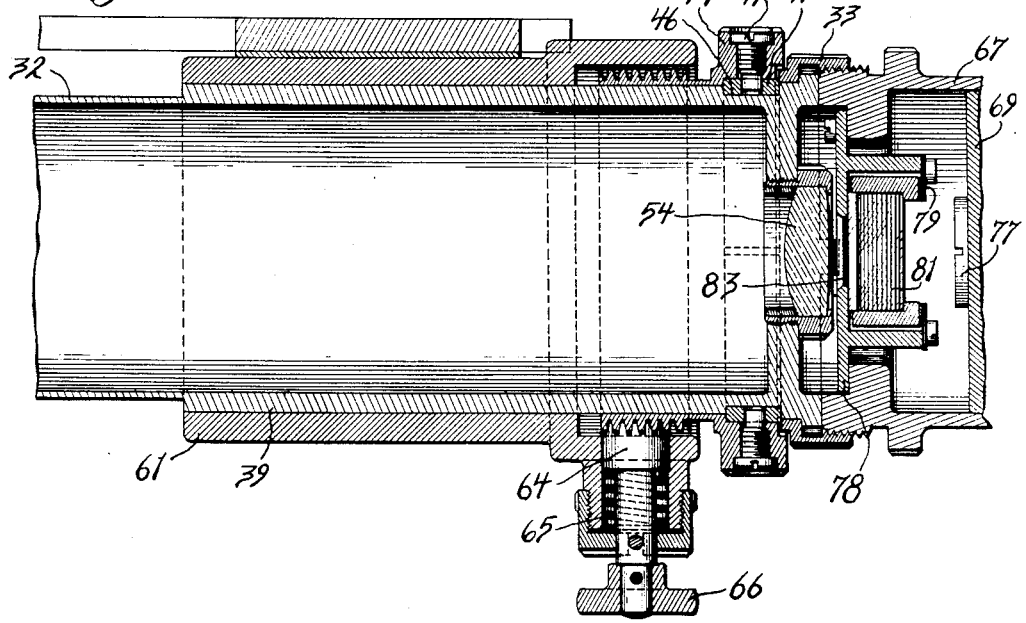
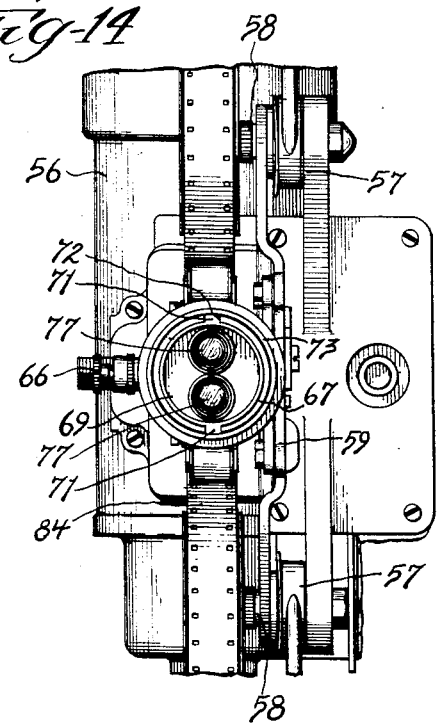
Inventor
Arthur Warmisham
By: Michle & Michle
Attys.

Patented July 3, 1934

1,964,968

UNITED STATES PATENT OFFICE 1,964,968

OPTICAL DEVICE

Arthur Warmisham, Evanston, Ill., assignor to The Bell & Howell Company, Chicago, Ill., a corporation of Illinois Application November 11, 1931, Serial No. 574,246

6 Claims. (Cl. 88—16.4)

My invention relates to a plural image optical system which is particularly adapted for the photographing or projection of plural images as involved in additive plural image systems used in stereoscopic and color picture systems, my system being especially applicable to color systems involving prismatic devices commonly known as "beam splitters".

The invention is particularly adapted for the photographing and projection of motion pictures and for motion picture equipment involving a shutter operating in front of the focal plane thereof, and has for its advantages, that it has no tendency for the mutual fogging of the plural pictures, that it is adapted for convenient adjustment for neutralizing shrinkage or other dimensional alteration occurring in a picture film, used with the system, between exposure and projection, and that, as a minor advantage, it permits of a quick change of objectives as is often required on modern motion picture cameras.

In the accompanying drawings forming a part hereof—

Figure 1 is a side elevation of a motion picture camera equipped with a camera objective device involving a form of the plural image optical system of my invention adapted for the taking of anaglyph pictures;

Figure 2 is a front elevation of the objective device shown in Figure 1;

Figure 3 is a partial section on the line 3—3 of Figure 1;

Figure 4 is a top plan view of the objective device shown in Figure 1;

Figure 5 is a partial section on the line 5—5 of Figure 4;

Figure 6 is a front elevation of certain of the structure shown in Figure 3;

Figure 7 is a partial section on the line 7—7 of Figure 4;

Figure 8 is a partial bottom plan view of the plural objectives and the removable carrier thereof of the objective device of Figure 1;

Figure 10 is section of the projection objective device of Figure 9 taken on the vertical axial plane thereof;

Figure 11 is a section on the line 11—11 of Figure 10;

Figure 12 is a section on the line 12—12 of Figure 10;

Figure 13 is a partial section on the line 13—13 of Figure 9; and

Figure 14 is a partial front elevation of the projection objective device and the projecting machine as shown in Figure 9.

Like characters of reference indicate like parts in the several views.

Figure 9:
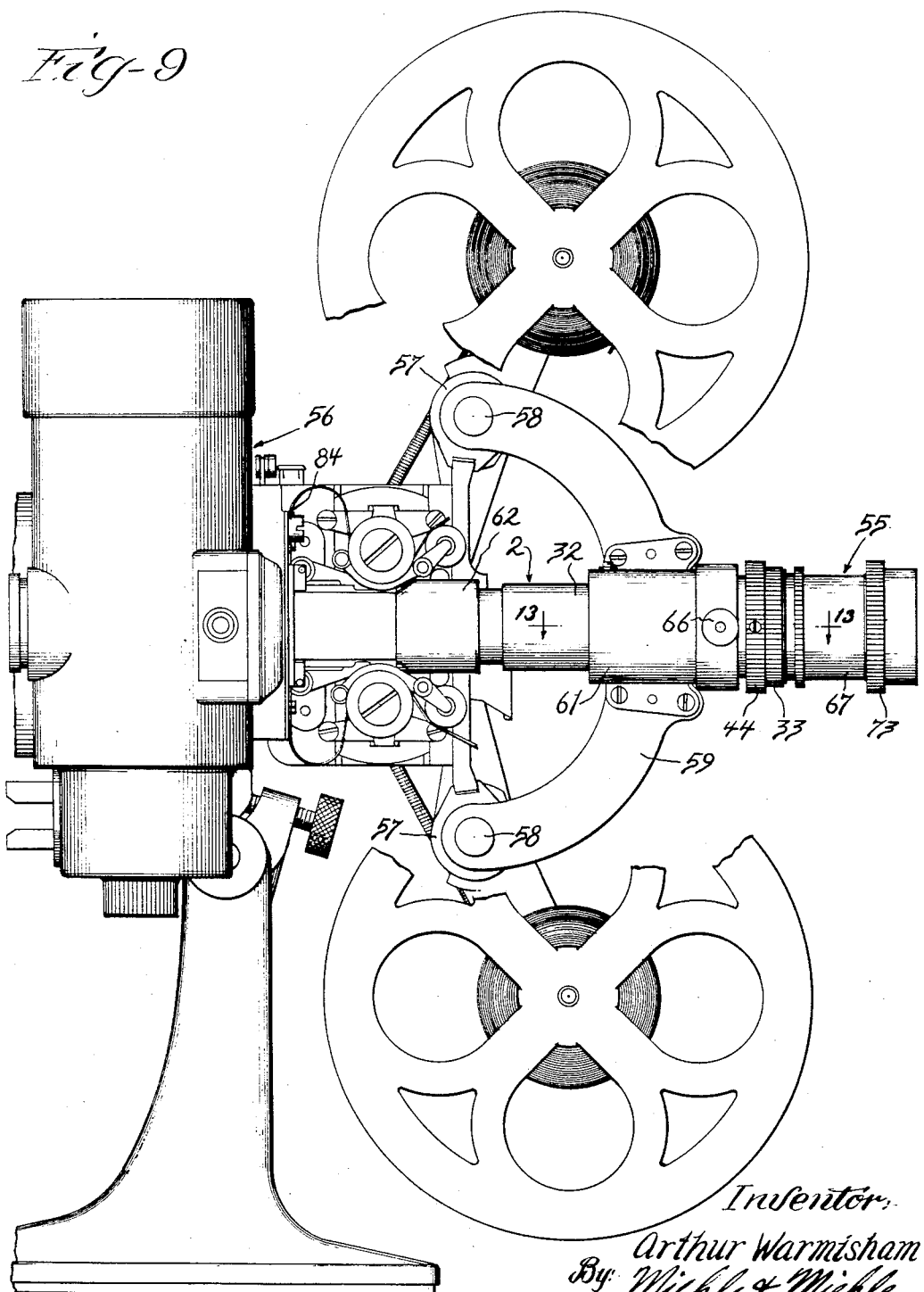
Figure 9 is a partial side elevation, with parts broken away, of a motion picture projecting machine equipped with a projection objective device involving a form of the plural image optical system of my invention adapted for the projection of anaglyph pictures.

Referring to Figures 1 to 4 inclusive the camera or photographing device of the system comprises a taking unit, generally indicated at 1, and a transfer unit, generally indicated at 2.

The taking unit is carried within an assembled frame 3 forming an enclosure and having a top opening at the main portion thereof which is closed by a cover 4 secured in closed position by a hand operated nut 5 screwthreaded upon a centrally disposed stud secured on the lower wall of the frame and extending upwardly therefrom. See Figures 1, 2, 4 and 5.

The frame 3 is provided in its front wall with two light openings 7, see Figures 2 and 3, which are relatively widely spaced horizontally, and secured within the frame immediately to the rear of respective of the openings 7, are two reflecting prisms 8 provided with internal reflecting surfaces 9 which are disposed to reflect light passing through the openings 7 on paths widely spaced horizontally to paths converging rearwardly, as will be seen in Figure 3. The prisms 8 are secured forwardly against the inner surface of the front wall of the frame 3 and downwardly upon ledges 11 and bosses 12 on the interior of the frame 3 by means of spring devices 13 and 14 for the convenient and accurate positioning of the same. See Figures 3 and 7.

Secured rearwardly on the frame 3 across a centrally disposed rear opening thereof, is a plate 15, on the front side of which and within the casing, are secured, in a suitable manner, as indicated generally at 16, see Figures 3, 5 and 6, two reflecting prisms 17 arranged in vertically adjoining relation and provided each with one of a pair of oppositely facing crossed vertically offset reflecting surfaces 18 which are disposed to reflect light reflected by the prisms 8 rearwardly on paths coincidental with reference to a horizontal plane and adjoining with reference to a vertical plane. See Figures 3 and 5.

An objective carrier 19 is provided at its forward end with a transversely disposed vertically extending slide formation 21 which is slidably engaged in a rearwardly facing transversely disposed and vertically extending channeled slide member 22 secured against the inner face of the intermediate front wall portion of the frame 3, spring slide members 23, secured on the frame, engaging forwardly against the side portions of the formation 21 to maintain the same in engagement with the member 22. Accordingly, the objective carrier 19 may be conveniently mounted in or removed from within the casing through the top opening thereof.

The objective carrier 19 rests on the bottom of the frame, and this engagement together with the engagement of the member 22 and slide members 23 predeterminately positions the objective carrier within the frame. Slidably mounted in an upwardly facing vertical bore of the intermediate forward portion of the objective carrier 19, is a stud 24 whose movement in this bore is limited by a radial pin 25 on this stud engaged in a slot 26 in the objective carrier 19. See Figures 3 and 5.

A coiled compression spring 27, disposed between the bottom of the stud 24 and the bottom of the bore in which this stud is mounted, yieldably urges the stud to its upper position in which it is used as a handle for inserting or removing the objective carrier.

When the objective carrier is mounted in the frame 3 and the cover 4 secured in closed position on the frame, see Figure 5, the stud 24 is engaged downwardly by the cover, so that the spring 27 serves to hold the objective carrier downwardly in the frame and in engagement with the bottom of the casing.

The rear portion of the objective carrier 19 is bifurcated in a horizontal plane to form mount portions 28 normal to the paths of light between the prisms 8 and 17, and mounted in bores through these mount portions 28 is a pair of matched camera objectives 29 of usual construction, which are alined with respective of the paths of light between the prisms 8 and 17 for the passage of the light therethrough.

The objectives 29 and the openings 7 are offset with reference to a vertical plane to correspond with the vertically adjoining relation of the prisms 17, so that the prisms 8 direct light between the objectives 29 and a pair of light paths spaced widely with reference to a horizontal plane and offset with reference to a vertical plane, and the prisms 17 direct light between the objectives 29 and a second pair of vertically adjoining light paths.

The objectives 29 are focused so that they form real optical images at vertically adjacent areas in a common real optical image plane thereof at the plate 15 which is centrally apertured, as designated at 31, to surround the plural image area of the objectives 29 and form a mask therefor.

The transfer unit 2 is carried within a tube 32, the front end of which is provided with a rotatable coupling nut 33 having a shoulder engagement therewith and screw threaded on the rear end of the frame 3 with the tube in centered relation with the mask opening 31 for detachably securing the taking unit on the transfer unit in abutting relation, the tube 32 being provided with forwardly projecting diametrically opposite lugs 34 engaging in rearwardly facing slots 35 in the rear end of the frame 3 for angularly positioning the frame 3 with reference to the tube 32. See Figures 3, 4 and 5.

The tube 32 is detachably mounted on a camera 36, as shown a standard motion picture camera, in coaxial relation with the focal axis of the camera, in the following manner. See Figures 1, 3 and 4.

Secured forwardly on the camera is a forwardly extending bracket 37 which terminates forwardly in a tubular formation 38 disposed in coaxial relation with the focal axis of the camera. An enlarged forward portion 39 of the tube 32 is slidably engageable in the tubular formation 38 and is angularly fixed therewith by means of a key 41 secured on the formation 38 and slidably engaging a keyway 42 on the tube 32.

The tube 32 is positioned axially with the formation 38 by means of the shoulder at the rear end of the enlarged portion 39 of the tube 32 being engaged rearwardly against an annular member 43, having a shoulder and screwthread engagement with the rear end of the formation 38, by means of an externally screwthreaded ring 44 screwthreaded into the forward end of the formation 38 and rotatably mounted on the tube 32 and axially fixed therewith by means of semicircular members 45 engaged for rotation in a circumferential groove 46 on the tube 32 and secured with the ring 44 by radial screws 47.

The rear end of the tube 32 is slidably engaged in a bushing 48 on the bracket 36 for additional support, the tube 32 and bushing 48 forming a closed light passage from the taking unit to the light or usual lens opening 49 of the camera behind which the focal or film plane 51 of the camera is disposed, the shutter 52 of the camera operating in a plane in front of the focal plane 51. See Figure 3.

Thus is the transfer unit 2 detachably mounted on the camera in predeterminately fixed relation therewith axially and angularly, while the taking unit 1 is detachably mounted on the transfer unit in predeterminately fixed relation therewith axially and angularly.

The optical structure of the transfer unit consists of a transfer or secondary objective comprising an objective lens 53 mounted intermediately within the tube 32 and a field lens 54 mounted in the front end of the tube 32 adjacent the image plane of the objectives 29 and functioning in the usual manner. The transfer or secondary objective, when used on the camera, transfers the real optical image at the image plane of the objectives 29 to the focal plane of the camera for the exposure of a film thereat.

The camera as so equipped takes anaglyph pictures each frame of the film receiving exposure to the two vertically adjoining images produced by the taking unit, the pairs of anaglyph pictures being advantageously arranged longitudinally of the film, which, as usual, extends vertically across the exposure aperture of the camera.

Referring to Figures 9 to 14 inclusive, the projection device of the system comprises a projection unit, generally indicated at 55, and a transfer unit similar to the transfer unit 2 and for this reason also designated at 2 and which is preferably the same transfer unit as is used in the camera device.

Accordingly, the same reference characters are used to designate the same parts of the transfer unit in Figures 9 to 14 inclusive as are used in Figures 1 to 8 inclusive and a second description thereof omitted.

The tube 32 of the transfer unit is detachably mounted on a picture projector 56, as shown a standard motion picture projector, in coaxial relation with the focal axis of the projector, in the following manner. See Figures 9, 10 and 14.

Secured on upper and lower reel arm structures 57 of the projector, as designated at 58, is a bracket 59 which is provided with a forwardly disposed tubular formation 61 disposed in coaxial relation with the focal axis of the projector and with the usual tubular projection lens mount formation 62 of the projector, which lens mount formation is disposed rearwardly of the formation 61.

The tube 32 is slidably engaged in the tubular formations 61 and 62 and is angularly fixed therewith by means of a key 63 secured on the formation 61 and slidably engaging the keyway 42 of the tube 32.

The tube 32 is adjustably positioned axially with reference to the projector by means of the ring 44 having screwthreaded engagement with the inner end of a radially disposed plunger 64 slidably mounted on the formation 61 and positioned inwardly to engage the ring 44 by a spring 65. See Figure 13. The outer end of the plunger 64 is provided with a knob 66 by means of which the plunger may be pulled out of engagement with the ring 44 for convenient removal and mounting of the tube 32.

The projection unit 55 is carried by a cylindrical body 67 which is detachably secured at its rear end with the front end of the tube 32 by means of the coupling nut 33 screwthreaded on the rear end of the body 67 to secure the body 67 and tube 32 in abutting relation, rearwardly facing slots 68 in the rear end of the body 67 being engaged by the lugs 34 of the tube 32 to angularly fix the projection and transfer units. See Figures 10 and 13.

Slidably engaged in the body 67, is an objective carrier 69, the forward end of which is provided with two diametrically opposite radial lugs 71 which extend through and are slidably engaged in forwardly disposed longitudinally extending slots 72 in the body 67 to angularly fix the body and carrier. See Figures 10 and 14.

An internally screwthreaded ring 73 is rotatably mounted on the forward end of the body 67 and is axially fixed therewith by means of semicircular members 74 engaged for rotation in a circumferential groove 75 on the body 67 and secured with this ring by radial screws 76. See Figures 10 and 12. The ring 73 has screwthreaded engagement with the outer ends of the lugs 71 so that rotation of the ring 73 effects axial adjustment of the carrier 69 with reference to the body 67.

Mounted within the carrier 69 in vertically spaced relation, is a pair of horizontally disposed projection objectives 77 which are axially adjustable with the carrier 69. See Figures 10 and 14.

Secured rearwardly on the body 67 and across a centrally disposed rear opening thereof, is a plate 78, on the front side of which and within the body 67, are secured in a suitable manner, as indicated generally at 79, two reflecting prisms 81 arranged in vertically adjoining relation and provided each with a pair of parallel opposing reflecting surfaces 82. The prisms 81 are arranged so that the reflecting surfaces 82 thereof extend forwardly from the plate 78 and vertically in opposite directions for directing light from vertically adjoining areas in a common image plane of the objectives 77 at the plate to respective of these objectives.

The plate 78 is centrally apertured, as designated at 83, to surround the aforesaid adjoining areas at said image plane and form a mask therefor.

On the projector, the transfer or secondary objective transfers images of vertically adjoining illuminated anaglyph pictures on a vertically disposed film 84 at the focal plane of the system to the image plane at the plate 78 and forms a real optical image thereat, which is masked by the aperture 83. The prisms 81 individually reflect the vertically adjoining images at said image plane to respective of the projection objectives 77 which in turn individually project the images nearly in superposition upon a screen, not shown, for viewing.

The projection objectives 77 are provided with color filters 85 of different colors, see Figure 10, for projecting the plural images in individual colors, so that the pictures projected on a screen give a <u>stereoscopic</u> effect when viewed through corresponding color filters of different colors for respective eyes of the observer, as is usual in the viewing of anaglyph pictures.

By reason of the system including the secondary objective, transferring the image between the real optical image plane and the focal plane of the system, the system is adapted to equipment involving a shutter operating in front of the focal plane thereof, there is no tendency for mutual fogging of the pictures because the plural images are transferred as one unit or image between the real optical image and focal planes of the system, and the adjustment of the secondary objective on the projector with reference to the focal plane of the system conveniently provides for neutralizing shrinkage or other dimensional alteration of the film between exposure and projection. The adjustment of the projection objectives 77 with reference to the image plane of the system provides convenient adjustment for projection screen distance. The provision for the use of the transfer unit on both the camera and projector reduces the equipment required, and the mounting of the camera objectives 29 on the removable carrier 19 provides for the convenient interchange of camera objectives of different characteristics.

The camera objectives 29 and the projection objectives 77 may be of any suitable conventional construction, while the optical data of the transfer or secondary objective consists as follows, the field lens being designated by the numeral 54, as heretofore, while the lens members of the objective lens 53 are designated by the numerals 86, 87, 88 and 89, as indicated in Figure 3, the dimensions being given in inches.

| | |
|---|---|
| Image plane to 54 | = .050 |
| Air space between 54 and 86 | =2.750 |
| Air space between 86 and 87 | = .020 |
| Air space between 87 and 88 | = .286 |
| Air space between 88 and 89 | = .020 |
| Distance between 89 and focal plane of camera | =2.330 |
| Distance between image plane and focal plane of camera | =6.502 |

| Surfaces | Thickness | Diameter | Clear |
|---|---|---|---|
| 54+2.4+.60 | .170 | .475 | .425 |
| 86 and 89+1.16∞ | .125 | .900 | .85 |
| 87 and 88+.72−.455 | .313 | .850 | .81 |

Aperture on concave .605.

While I have described and shown the preferred embodiment of my invention I do not wish to be limited to the precise details of construction as changes may readily be made without departing from the spirit of my invention, but having thus described my invention, I claim as new and desire to secure by Letters Patent the following.

1. In a plural image optical system the combination of a plural image objective device comprising a pair of objectives and reflecting means for directing light between said objectives and respective of immediately adjoining areas at a common real optical image plane of said objectives, a secondary objective transferring an image between said adjoining areas at said image plane and the focal plane of the system and mask aperture means at said image plane and defining said areas.

2. In a plural image optical system the combination of a plural image objective device comprising a pair of matched objectives and reflecting means for directing light between said objectives and respective of immediately adjoining areas at a common real optical image plane of said objectives, a secondary objective transferring an image between said adjoining areas and the focal plane of the system, and rectangularly apertured mask means at said image plane and defining said areas.

3. In a plural image optical system the combination of a plural image objective device comprising a pair of matched objectives and reflecting means associated therewith for directing light therethrough between respective of a pair of spaced light paths and respective of another pair of immediately adjoining light paths arranged in a plane substantially normal to the plane of said first mentioned paths and between said objectives and respective of immediately adjoining areas at a common real optical image plane of said objectives on said second mentioned paths, a secondary objective transferring an image between said adjoining areas and the focal plane of the system, and mask aperture means at said image plane and defining said areas.

4. In a plural image optical system the combination of a plural image objective device comprising a pair of matched objectives and reflecting means associated therewith for directing light therethrough between a pair of widely spaced light paths and respective of another pair of adjoining light paths arranged in a plane substantially normal to the plane of said first mentioned paths, said reflecting means including crossed offset reflecting surfaces adapted to reflect light between said objectives and respective of adjoining areas at a common real optional image plane of said objectives on said second mentioned pair of paths, mask aperture means at said image plane and defining said areas, and a secondary objective transferring an image between said adjoining areas and the focal plane of the system.

5. In a plural image optical system the combination of a plural image projection objective device comprising a pair of matched objectives and reflecting means associated therewith for directing light between said objectives and respective of immediately adjoining areas at a common real optical image plane of said objectives, a secondary objective transferring a plural image from the focal plane of the system to said adjoining areas at said image plane, mask aperture means at said image plane and surrounding said areas, and color filters of different colors for individually coloring the images projected by said matched objectives.

6. In a plural image objective device the combination of a pair of objectives and reflecting means cooperating therewith, a support forming an enclosure and having an opening and carrying said reflecting means in fixed position therein, a second support on which said objectives are mounted in predetermined relation, means whereby said second support carrying said objectives is removably mounted within said first mentioned support in predetermined position and removable through said opening, a cover for closing said opening, releasable means securing said cover on said first mentioned support in position closing said opening, and a spring pressed member on said second support and urged against said cover in closed position for fixing said second support within said first mentioned support.

ARTHUR WARMISHAM.